Jan. 9, 1951 E. J. NECRASON 2,537,231
NONSKID DEVICE
Filed Aug. 13, 1946
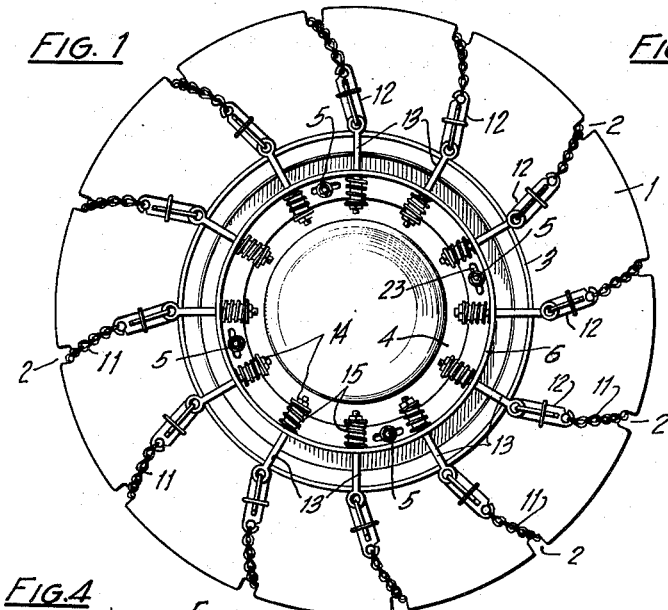
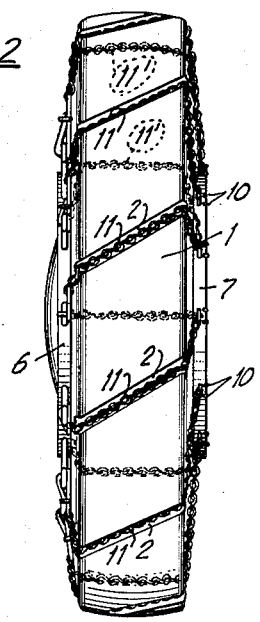
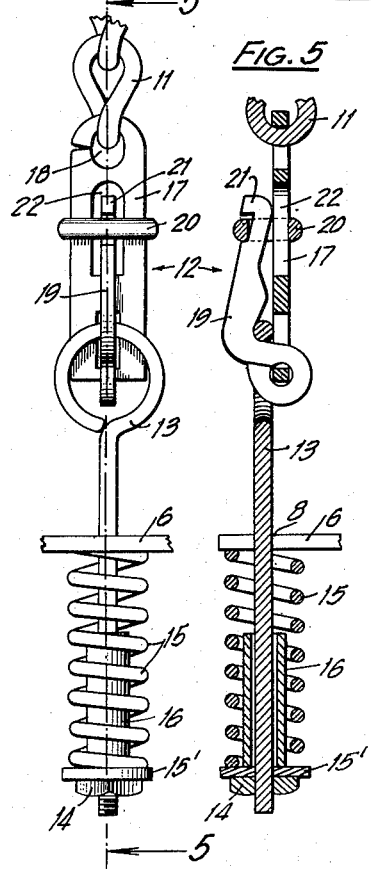
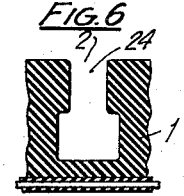
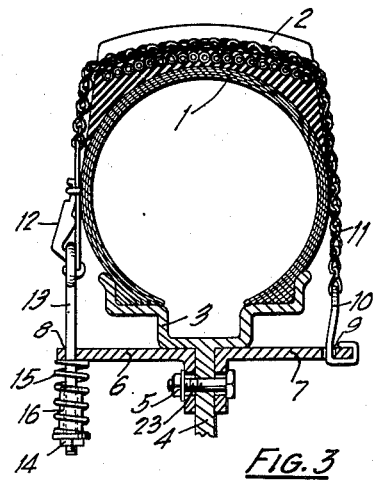
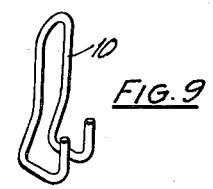
INVENTOR
E. J. NECRASON,
BY
HIS ATTORNEY.

Patented Jan. 9, 1951

2,537,231

UNITED STATES PATENT OFFICE 2,537,231

NONSKID DEVICE

Edmund J. Necrason, Afton, N. Y.

Application August 13, 1946, Serial No. 690,153

4 Claims. (Cl. 152—218)

My invention relates to non-skid devices, and particularly to devices of this type adapted for attachment to the wheel of a motor vehicle.

In those seasons of the year when the temperature is consistently below the freezing point or frequently is in close proximity thereto, chains or similar devices must be often attached to the wheels of motor vehicles to provide traction and prevent skidding on roads which are covered with snow or coated with ice. Chains of the conventional type are difficult both to apply and to remove and, once applied, they cannot economically be left on the wheels when they are no longer necessary because, on bare pavements they wear very rapidly and the cross chains thereof break and must be replaced. Furthermore, on bare pavements, such as concrete, they produce a very unpleasant sound and vibration in the vehicle.

The principal object of my invention is to provide an improved type of non-skid chain which is adapted for use with a novel type of tire and which, when once applied thereto, may be left thereon throughout the cold weather season without causing unpleasant noise and vibration in the vehicle or wear on the chains when they are not functioning as an anti-skid device. Another object is to provide a non-skid chain and tire or wheel combination in which the cross chains are normally positioned in comparatively deep grooves extending transversely in the tire tread but from which they may be readily removed and extended across an ungrooved portion of the tread whereby they will function in the same way as conventional cross chains to provide traction and prevent skidding.

I accomplish these objects by means of the novel elements and the combinations and arrangements thereof described below and illustrated in the accompanying drawing in which—

Fig. 1 is a side elevation of a vehicle wheel showing my chains secured thereto in the position which they would normally occupy when not functioning to provide traction and prevent skidding;

Fig. 2 is a side view of Fig. 1;

Fig. 3 is a fragmentary enlarged cross section of the vehicle wheel showing one of my chains in a groove in the tread of a tire;

Fig. 4 is a front elevation view of a quick detachable means for securing one end of each of the cross chains to the wheel;

Fig. 5 is a section of Fig. 4 in the plane 5—5;

Figs. 6, 7 and 8 are cross sections of various types of grooves which may be formed in the tread of the tire to hold the cross chains when not in use; and Fig. 9 is a perspective view of a hook for permanently securing one end of a cross chain to a chain holding ring on the inside of the wheel.

Referring to the drawing—

1 is a tire having a plurality of equispaced, transversely-extending grooves 2 in the tread thereof. Preferably twelve of these grooves are formed in the tire and they extend across the tread of the tire, as viewed in plan, at an angle of approximately 30° to the axis of the tire. In other words, the ends of the grooves at one side of the tread are preferably 30° in advance of the ends of the grooves at the other side of the tread. 3 is the rim of the wheel on which the tire 1 is mounted and 4 is the disc of the wheel which carries the rim 3. Secured to each side of the disc 4 by means of bolts 5 are chain holding rings 6 and 7 which are angular in cross section; one leg of each of the angles being secured to the disc 4 and the other legs extending outwardly from the disc, as best shown in Fig. 3. The outstanding legs of the rings 6 and 7 are provided with openings 8 and 9 therein which are circumferentially spaced 30° apart and disposed with the openings 8 in the ring 6 directly opposite the openings 9 in the ring 7.

Permanently secured by hook members 10 to the ring 7, which is on the inside of the wheel, are the cross chains 11 which are normally positioned, when not in use, in the grooves 2 which are deep enough to prevent the chains from contacting the pavement when the vehicle is in operation.

Permanently secured in the other end of each of the cross chains is a quick detachable means, represented generally by the numeral 12, which serves to secure the other end of the chain to the eye bolts 13 which pass through the openings 8 in the ring 6. The ends of the bolts 13 opposite the eyes are threaded to receive nuts 14, and helical springs 15 surrounding the bolts are compressed between the inner face of the ring 6 and washers 15'. To limit the upward movement of the eye bolts 13 against the compression of the springs 15, collars 16 surround the eye bolts within the springs, as best shown in Figs. 3, 4, and 5.

The quick detachable means 12 which secures the end of each of the chains 11 to an eye bolt 13 may be the same as now used to secure together the ends of the circumferentially extending chains of a conventional tire chain. Thus, each of the means 12 comprises a flat plate 17 which is permanently secured to one end of the chain 11, as shown at 18, and to which is pivoted, at the other end, a hook 19. The hook 19 is normally held in the positions shown in Figs. 4, 5, and 6 by means of the slip ring 20. However, by pushing the end 21 of the hook partially into the opening 22 in the flat member 17, the slip ring 20 may be moved upwardly out of engagement with the hook whereupon the hook 19 may be swung downwardly about its pivotal connection with the member 17 and disengaged from the eye bolt. To anyone familiar with the conventional tire chains, it is well known that hooks of this order function as levers to tighten the circumferentially extending chains thereof. Thus, in attaching the hooks to the eye bolts, it is only necessary to insert the end 21 of the hook into the eye of the bolt and then raise the hook upwardly to the position shown in Figs. 4 and 5. This movement of the hook will pull the eye bolt 13 upwardly against the compression of the springs 15 so that the cross chains will be taut.

In warm seasons, the chains would ordinarily be removed from the wheels by simply disconnecting them from the chain holding rings 6 on the outside of the wheels and then removing the rings 6 and 7 by taking out the bolts 5. To replace them, it is only necessary properly to position the rings and tighten the bolts 5 which pass through the slotted openings 23 therein. After the rings 6 and 7 are properly positioned, the chains which are permanently secured at one end to the ring 7 on the inside of the wheel are positioned in the grooves 2 and the free ends thereof secured to the eye bolts 13 by means of the quick detachable securing means 12.

When it is necessary so to position the chains that they will function to provide traction and prevent skidding, it is only necessary to disconnect the free end of each chain and to re-connect it to the eye bolt which is substantially directly opposite the point where the other end of each chain is fastened to the inside ring 7, and the chains will then occupy the positions shown in dotted outlines 11' in Fig. 2.

In Figs. 1 and 2, I have shown the grooves in the tire as of substantially uniform width from top to bottom. However, the grooves may be made narrower at the top than at the bottom, as shown at 24 in Figs. 6 and 7, so that either one or both of the sides of the groove, at the top thereof, will overhang the bottom of the groove. Since cross chains are wider in one direction than in the other, they may be inserted through narrower portions of the grooves by turning them on edge, so to speak, and then turning them flat after they have entered the bottom of the groove.

Instead of having the overhanging top edges of the grooves continuous, they may be interrupted, as by having alternate overhanging portions 25 and 26 on each side, as shown in Fig. 8. In any case, the overhanging sides of the grooves at the top thereof will prevent the chains from being thrown out of the grooves by centrifugal force at high vehicle speeds.

From the foregoing, it will be apparent that I have provided a non-skid chain, or non-skid chain and tire combination in which the chains may be left permanently on the wheels during the seasons when it may be necessary to use them from time to time, depending on weather conditions.

I have stated above that I prefer to have the grooves extend transversely across the tread at an angle of about 30° to the axis of the tire, as viewed in plan, because, with tires having a tread of standard thickness, the distance between the points of attachment of a cross chain, as measured along the bottom of the groove in which it is lying is about the same as the distance between points of attachment which are directly opposite each other on the front and back of the wheel, as measured around an ungrooved portion of the tread. Thus, the cross chains are substantially taut whether they are lying in the grooves or in functioning position across the tread; any slight difference in the distances between the points of attachment being compensated for by the springs.

By properly correlating the thickness of the tread, the depth and number of the grooves, with the angle at which the grooves are cut or molded, so as to maintain the chains taut in either their functioning or non-functioning position, considerable variation in the angle of the grooves may be effected.

It is to be understood that the drawings are more or less conventional and serve merely to illustrate my invention in its broader aspects.

What I claim is:

1. A tire casing for a motor vehicle having a plurality of equicircumferentially spaced grooves in the tread thereof extending transversely across said tread with the ends of said grooves on one side thereof substantially in advance of the ends of said grooves on the other side thereof; at least one side of each of said grooves being provided with a portion overhanging the bottom of said groove and adapted to overlie and retain a non-skid cross chain in each of said grooves when laid flat in the bottom thereof; whereby said overlying portions will prevent said chains from being thrown out of said grooves by centrifugal force developed by the rotation of said tire when operating.

2. A non-skid device comprising the combination with a vehicle wheel having mounted on the rim thereof a tire provided in its tread with a plurality of equicircumferentially-spaced, comparatively deep grooves substantially straight throughout extending transversely of said tire and disposed at an oblique angle to the central meridian plane of said tire, a pair of rigid, chain-holding rings, means detachably securing said rings to said wheel, one on each side thereof, and adjacent said rim, a plurality of separate, non-skid cross chains each normally positioned in one of said grooves, means securing one end of each of said chains to the ring on the inner side of said wheel, and means, including a spring and quick detachable means, securing the other end of each of said chains to the ring on the outer side of said wheel and normally holding said chains tautly in said grooves and out of contact at all times with the surface over which said vehicle may be moving; the depth of said grooves being substantially in excess of the thickness of said chains; and the depth of said grooves and the obliquity of said angle being so correlated that the distance transversely around the tread of said tire, as measured along the bottom of a groove, is approximately the same as the distance transversely around said tread, as measured in a plane perpendicular to the central meridian plane of said tire in a zone between said grooves; whereby, said chains may be removed from their normal positions in said grooves and secured in substantially tight skid-preventing positions around said tread by detaching the ends of said chains from said ring on the outer side of said wheel and reattaching them to said outer ring at points substantially opposite their points of attachment to the ring on the inner side of said wheel.

3. A tire adapted to be applied to the rim of a motor vehicle wheel and having a tread integral therewith provided with a plurality of equicircumferentially-spaced, substantially straight transversely-extending grooves therein each of a width and depth adapted to have a non-skid cross chain positioned therein with its upper, exposed surface disposed and maintained at all times substantially below the immediately adjacent surface portions of said tread; whereby said cross chains, when so positioned and disposed in said grooves will be at all times entirely out of contact with the road surface on which said vehicle may be operating; the ends of said grooves being open; the end of each groove in one side of said tread being substantially in advance of the end thereof in the other side of said tread; and the distance transversely around the tread of said tire, as measured along the bottom of a groove, being approximately the same as the distance transversely around said tread as measured in a plane perpendicular to the central meridian plane of said tire in a zone between said grooves; whereby, non-skid cross chains of uniform length may be normally carried out of wearing contact with said road surface when positioned in said grooves but, when needed, may be removed from said grooves and positioned in substantially tight, skid-preventing position around said tread between said grooves.

4. A non-skid device adapted for attachment to the wheel of a motor vehicle comprising a tire adapted to be mounted on the rim of said wheel and having a tread integral therewith provided with a plurality of equicircumferentially-spaced, substantially straight grooves therein extending entirely across said tread at an oblique angle to the central meridian plane of said tire; each of said grooves being of a width and depth adapted to have a non-skid cross chain positioned therein with its upper surface disposed and maintained at all times substantially below the surface portions of said tread immediately adjacent said groove; whereby, when so positioned and disposed said chain will be entirely out of contact with the road surface on which said vehicle may be operating; a pair of rigid chain-holding rings provided with means adapting them to be secured to said wheel on opposite sides thereof adjacent said rim, a plurality of cross chains each adapted to be positioned in one of said grooves, means at one end of each of said chains securing said ends of said chains to one of said rings at equicircumferentially-spaced points thereof, and means, including a spring and quick detachable means, cooperating with the other end of each of said chains, for yieldably and detachably securing said ends to the other of said rings at equicircumferentially-spaced points thereof for holding said chains tautly in said grooves when said device is attached to said wheel; the depth of said grooves and the obliquity of said angle being so correlated that the distance between the points of attachment of each of said chains to said rings, as measured along the bottom of a groove, is approximately the same as the distance between the point of attachment of any one of said chains to one of said rings and the point of attachment of one of the next adjacent chains to the other of said rings, as measured transversely around said tread in a zone between said grooves; whereby, non-skid cross chains of uniform length may be normally carried out of wearing contact with said road surface when positioned in said grooves but, when needed, may be removed from said grooves and positioned in substantially tight skid-preventing position around said tread between said grooves.

EDMUND J. NECRASON.

REFERENCES CITED

The following references are of record in the file of this patent:

UNITED STATES PATENTS

| Number | Name | Date |
|---|---|---|
| 901,300 | Rovere | Oct. 13, 1908 |
| 901,654 | Sills | Oct. 20, 1908 |
| 1,337,443 | Demas | Apr. 20, 1920 |
| 1,456,729 | Fraser | May 29, 1923 |
| 1,563,960 | Brockhurst | Dec. 1, 1925 |
| 2,078,764 | Kielmansegg | Apr. 27, 1937 |

FOREIGN PATENTS

| Number | Country | Date |
|---|---|---|
| 10,550 | Great Britain | May 6, 1907 |